United States Patent [19]

Braun

[11] Patent Number: 5,508,088
[45] Date of Patent: Apr. 16, 1996

[54] TIMING DEVICE AND METHOD OF MANUFACTURE THEREFOR

[76] Inventor: Paul-Wilhelm Braun, Lindau Str. 23, Troisdorf, Germany, 53842

[21] Appl. No.: 312,602

[22] Filed: Sep. 27, 1994

[30] Foreign Application Priority Data

Sep. 27, 1993 [DE] Germany ............... 43 32 808.3
Aug. 25, 1994 [DE] Germany ............... 44 29 892.7

[51] Int. Cl.⁶ .................................... B32B 9/00
[52] U.S. Cl. .................. 428/195; 428/209; 428/913; 356/25; 356/28
[58] Field of Search ............... 428/209, 210, 428/913, 195; 414/335; 369/52, 32; 355/32, 35, 67, 75, 230; 400/323; 346/139 R; 354/11; 356/27, 48, 52, 58, 423, 24, 25, 138, 28

[56] References Cited

U.S. PATENT DOCUMENTS

| 3,881,184 | 4/1975 | Koepcke | 369/32 |
|---|---|---|---|
| 4,343,012 | 8/1982 | Knapp | 346/139 R |
| 4,376,609 | 3/1983 | Bohman | 414/335 |
| 4,400,069 | 8/1983 | St. Pierre | 354/11 |
| 4,603,984 | 8/1986 | Ullenboom | 400/323 |
| 4,644,156 | 2/1987 | Takahashi et al. | 250/231 |
| 4,661,697 | 4/1987 | Takahashi et al. | 250/231 |
| 4,783,679 | 11/1988 | Anzai | 355/230 |
| 4,797,711 | 1/1989 | Sasada | 355/32 |
| 4,806,751 | 2/1989 | Abe et al. | 250/231 |
| 5,282,187 | 1/1994 | Lee | 369/52 |

FOREIGN PATENT DOCUMENTS

2173295   10/1986   United Kingdom .

*Primary Examiner*—Patrick J. Ryan
*Assistant Examiner*—Patrick Jewik
*Attorney, Agent, or Firm*—Brumbaugh, Graves, Donohue & Raymond

[57] ABSTRACT

Disclosed are a timing device for controlling machine tools, handling equipment or other servomechanical elements and a method of manufacture. The timing device comprises a timing control element which includes a plurality of transparent windows and opaque windows arranged in a selected pattern and a reflective means disposed behind the transparent and opaque windows for reflecting light. A transmitter emits light toward the timing control element. The device further comprise means for operating the timing control element to controllably select one of the transparent and opaque windows to be in the path of the emitted light. The emitted light propagates through one of the transparent windows, and is reflected by the reflective means only when the selected window is transparent. A receiver, disposed adjacent to the transmitter, generates an electrical signal in response to the reflected light.

14 Claims, 2 Drawing Sheets

TIMING DEVICE AND METHOD OF MANUFACTURE THEREFOR

BACKGROUND OF THE INVENTION

The invention relates to a timing device for controlling machine tools, handling equipment or other servomechanical devices, and to a method of manufacture. The timing device typically comprises a timing control element, a transmitter, and a receiver.

In general, timing control elements are either rotatable about a central axis, i.e., timing disk, or are movable in a linear direction, i.e., timing rule. Light, projected by a transmitter, passes through the control element, and is intercepted by the receiver. The receiver, responsive to the light, converts the light into an electrical signal capable of controlling machinery and other servomechanical devices.

Timing control elements typically are encoded with a selected window pattern, i.e., they have an annular or linear array of windows which alternate in a transparent window, opaque window, transparent window, opaque window pattern. While the transparent window openings allow the transmitted light to pass through the timing disk or rule, the opaque windows prevent the light from passing through the timing disk or rule.

Timing disks as a rule are fixed to a rotating shaft by means of a hub. For linear systems, timing rules are arranged at right angles to a source of light and the associated receiver generates an electrical signal in response to the incoming light. This particular application is used, for example, to control the feeding action of machine tools.

As the timing disk rotates or the timing rule moves in a linear direction, light is directed at the selected window pattern. Because of the window pattern, the transmitted light can only pass through a transparent window. In response to the light, the receiver generates an electrical signal.

The electrical signals serve to establish a control surface for the measurement of rotational speed, acceleration and more accurate positioning of servomechanical elements, as for example a printing head, a robot arm or a tool carrier.

Timing control elements can be made of glass, metal or plastic, however, plastic and metal are typically used in mass production applications. They are produced, for example, in the case of angle indicators or encoding units, e.g. ink jet printers, out of transparent films.

Timing control elements are generally constructed of light-sensitive film. Coding of the film occurs when the film is exposed to light passed through a template means. The coding results in the production of an alternating pattern of transparent and opaque windows. Individual disks or rules are then cut out of the film material to generate timing disks or timing rules, respectively.

Known timing devices utilize an arrangement whereby the transmitter is placed on one side of the timing structure and the receiver is placed on the other side of the timing structure to capture the light as it passes through the disk. This arrangement has been known to cause a number of problems, including: a requirement for a complex electromechanical apparatus, increased mechanical stress caused by oscillating loads, a larger footprint size for the timing device, and dirt forming on the timing structure, thereby preventing light from passing efficiently through the structure.

SUMMARY OF THE INVENTION

An object of the present invention is to provide a timing device which has a simpler design.

It is another object of the present invention to provide a timing device that is not prone to mechanical stresses such as oscillation forces.

It is yet another object of the present invention to provide a timing device which enables the transmitted light to be efficiently received by an electrical signal generating receiver.

The objects of the present invention are achieved by providing a timing device for the accurate positioning of machine tools, handling equipment or other servomechanical elements. The device has a timing control element including thereon a plurality of transparent windows and opaque windows arranged in a selected pattern. A reflective means is disposed behind the transparent and opaque windows for reflecting light. The device further comprises means for operating the timing control element to controllably select one of the transparent and opaque windows to be in the path of the emitted light. The emitted light propagates through the selected window and is reflected by the reflective means only when the selected window is transparent. A receiver is disposed adjacent to the transmitter for generating an electrical signal in response to the reflected light.

The timing control element comprises a light sensitive-layer having the transparent and opaque windows, and the reflective means disposed on a selected surface of the light-sensitive layer. The control element further comprises a transparent layer disposed on a surface of the light-sensitive layer opposite the selected surface.

The reflective means has a metallic coating which is formed by a thin-film process. The metallic coating comprises a selected metal of copper, aluminum, chromium and silver. Disposed on top of the metallic coating is a protective layer to protect the reflective means against mechanical damage.

The timing control element can be either a timing disk or a timing rule. The timing disk is a rotatable disk having the transparent and opaque window pattern on the periphery thereof. The selected window pattern can be selected from a plurality of patterns arranged concentric to one another on the rotatable disk.

The timing rule also has the transparent and opaque window pattern disposed thereon, so that the respective patterns are arranged in a selected sequence on the timing rule. The window pattern can be such that the sizes of the transparent and opaque windows are uniform, or the pattern can bear a logarithmic relationship. The timing rule has means for fastening the timing rule in a preselected location. The means for fastening includes fastening openings located at each end of the timing rule.

A method for producing a timing control element including a light-sensitive layer includes the steps of passing light through a template means having a selected window pattern onto the light-sensitive layer. The light-sensitive layer is then exposed to the window pattern to encode the light-sensitive layer according to the selected window pattern. After the exposure process, the portions of the light-sensitive layer which have been exposed to the light are transparent windows, while the non-exposed portions of the light-sensitive layer are opaque windows, i.e., black and non-reflecting. Next, a reflective coating is applied to the selected surface of the light-sensitive layer. The inventive methodology further comprises the step of adhering a transparent layer to the encoded light-sensitive layer on a surface opposite the selected surface.

The reflective means of the timing control element comprises a metallic coating which is produced by a thin-film process. The metallic coating is vapor-deposited on the selected surface of the light-sensitive layer by a high-vacuum process so that the metallic coating is adhered to the light-sensitive layer. Generally, the metallic coating is comprised a selected metal of copper, aluminum, chromium and silver. A protective layer is also added to the metallic layer to protect against mechanical damage.

Thus, through utilization of the reflective means, the present invention enables an arrangement wherein the transmitter and receiver are located adjacent to each other on the same side of the timing structure. Thus, the transmitter and receiver—that is to say, source of light and optical sensor—may be combined in a chip and thus intimately associated with the timing disk. As a result, light path distances are reduced, the oscillatory load is smaller, and the dust hazard is virtually eliminated.

BRIEF DESCRIPTION OF THE DRAWING

FIG. 1b shows a cross-sectional side view of the timing device of FIG. 1a;

FIG. 2a shows a frontal view of a prior art timing device in which the timing control element is a timing disk;

DETAILED DESCRIPTION

Figure 1B:
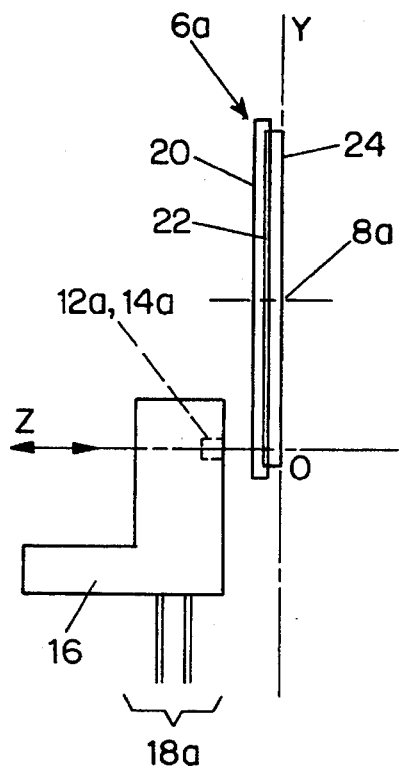
Figure 1A:
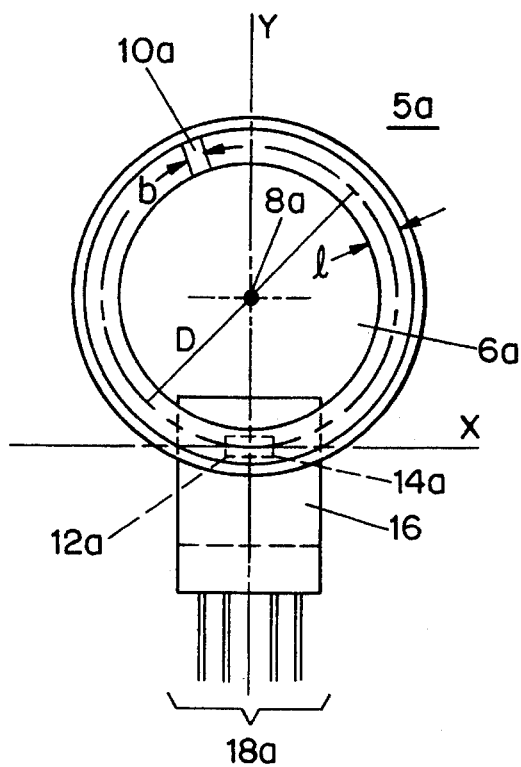
FIG. 1a shows a frontal view of the timing device according to the present invention in which the timing control element is a timing disk.
Figure 4:
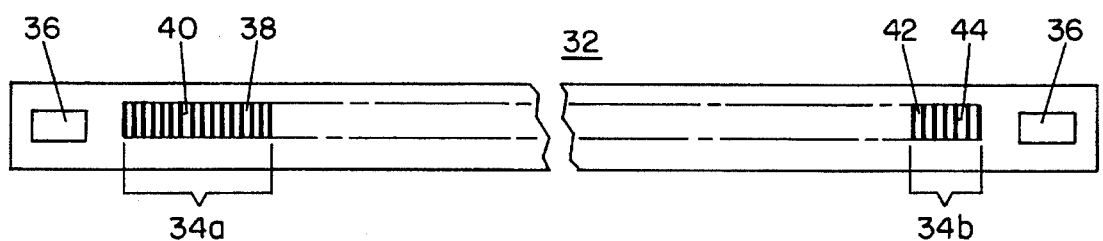
FIG. 4 shows a frontal view of a timing ruler according to the present invention.

As shown in FIG. 1a, a timing device 5a for the accurate positioning of machine tools, handling equipment or other servomechanical elements includes a timing control element 6a or timing disk 6a having a diameter (optical diameter D) and which is fixed to a rotating shaft be means of a hub 8a. As shown in FIG. 4, the timing control element can also be a timing rule 32 movable in a linear direction.

In FIG. 1a, the timing disk 6a includes a plurality of transparent windows 10a and opaque windows having a length t and a width b. The transparent windows 10a and opaque windows are arranged on the outer periphery of the timing disk 6a in a selected window pattern. As seen in FIG. 1 c, a reflective means 24 is disposed behind the light-sensitive layer which includes the transparent 10a and opaque windows.

As shown in FIG. 1b, the transmitter 12a emits light along optical axis z toward the timing control element 6a. The timing device 5a further comprises control mechanism (not shown) for operating the timing control element to select one of the transparent and opaque windows to be in a path of the emitted light. The emitted light propagates through the selected windows and is reflected by the reflective means 24 only when the selected window is transparent. A receiver 14a, disposed adjacent to the transmitter 12a, generates an electrical signal in response to the reflected light. Lines 18 connect the transmitter 12a and the receiver 14a to a control circuit (not shown).

Figure 1C:
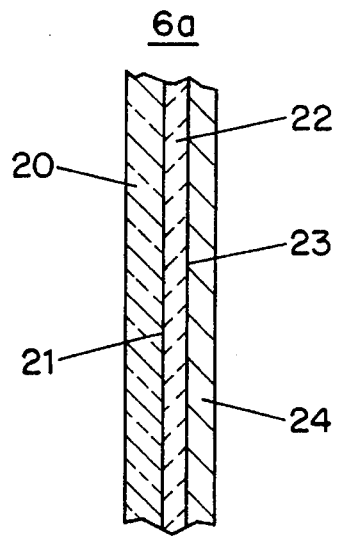
FIG. 1c shows a cross-sectional side view of a section the timing control element.

As shown in FIGS. 1a and 1c, the timing control element 6a comprises a light-sensitive layer 22 having transparent 10a and opaque windows. The reflective means 24 is disposed on a selected surface 23 of the light-sensitive layer 22. The control element 6a further comprises the transparent layer 20 disposed on a surface 21 of the light-sensitive-layer 22 opposite the selected surface 23.

The reflective means 24 comprises a layer having a metallic coating, formed by a thin-film process, which includes a selected metal of copper, aluminum, chromium and silver. The thin-film process includes the step of vapor coating the light-sensitive layer 22 on a selected side 23 by a high-vacuum process. A protective layer is added to the metallic coating to protect the reflective means 24 against mechanical damage.

In principle, the light-sensitive layer 22 may alternatively be arranged on the other side of the transparent material 20, adjacent to a sensor 16. In that case, however, diffraction phenomena may occur when the light emitted by the transmitter 12a passes through the light-sensitive layer 22. Hence it is advantageous to minimize the distance between the layers traversed by the light after reflection. This is the case in the alternative first mentioned.

Figure 3:
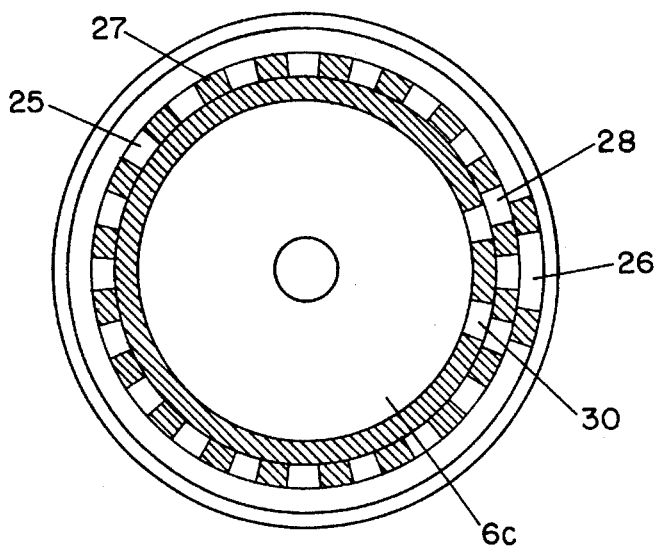
FIG. 3 shows a frontal view of a timing disk according to the present invention having a plurality of patterns arranged concentric to one another.

As seen is FIG. 3, the timing control element comprises a rotatable disk 6c having the transparent 25 and opaque 27 window patterns on the periphery thereof. The selected window pattern is selected from a plurality of patterns 26, 28, 30 arranged concentric to one another on the rotatable disk 6c.

Alternatively, as seen in FIG. 4, the timing control element comprises a timing rule 32 having the transparent 38 and opaque 40 window pattern disposed thereon. The window patterns 34a, 34b are arranged in a selected sequence on the timing rule 32. The sizes of the transparent 38 and opaque 40 windows in one of the selected patterns 34a are uniform. In another of the selected patterns 34b, the sizes of the transparent 42 and opaque 44 windows bear a logarithmic relationship.

The timing rule 32 further comprises means for fastening the timing rule 32 in a pre-selected location. The means includes fastening openings 36 located at each end of the timing rule 32.

Figure 2A:
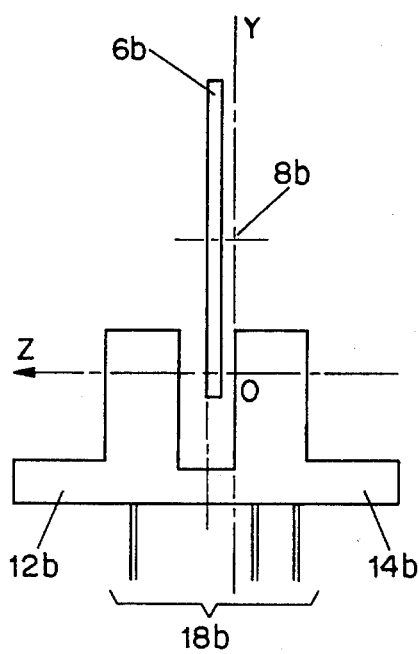
FIG. 2a shows a cross-sectional side view of a prior art timing device.
Figure 2B:
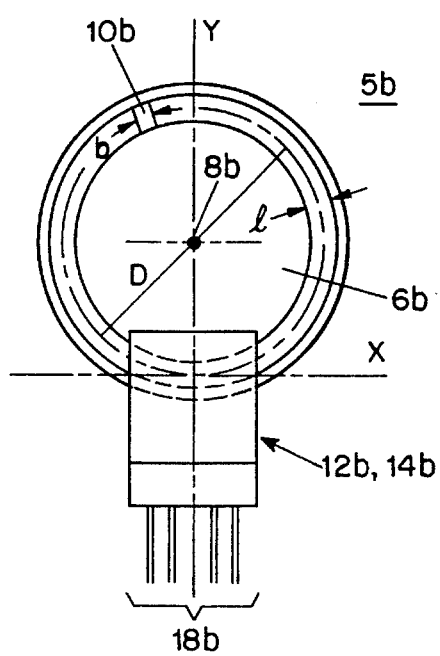

Similarly to FIG. 1a, FIG. 2b shows a prior art timing disk 6b having a diameter (optical diameter D) and which is rotatable about a hub 8b. On the outer periphery of the timing disk 6b, windows 10b are arranged, having a length t and a width b. As shown in FIG. 2a, the prior art timing device has the transmitter 12b and the receiver 14b positioned on opposite sides of the timing disk 6b.

Because the transmitter 12b and the receiver 14b are located on opposite sides of the timing disk 6b, the optical path of the light is much longer than when the transmitter 12b and receiver 14b are colocated on the same side of the timing disk 6b. Additionally, the configuration in FIG. 2a utilizes an increased number of control lines 18b, and utilizes larger components, therefore the space required for the prior art timing device shown in FIG. 2a is greater than for the timing device according to the invention.

To produce the light-sensitive layer 22 for the timing disk 6a according to the present invention, light is passed through a template means (not shown) having a selected pattern. The light-sensitive layer 22 is exposed to the selected window pattern in order to encode the layer according to the selected window pattern. As shown in FIG. 3, the portions of the light-sensitive layer 22 exposed to the light become transparent windows 26 when developed, while the portions not exposed to the light become opaque windows 28 when developed. The opaque windows 28 are black and do not allow light to pass through onto the reflective means 24. As shown in FIG. 1c, a reflective coating 24 is then applied to a selected surface 23 of the light-sensitive layer 22. The method further comprises the steps of adhering a transparent layer 20 to the encoded light-sensitive layer 22 on a surface 21 opposite the selected surface 23.

To reflect light from the transmitter 12a to the receiver 14a, a selected surface of the light-sensitive layer 22, the surface not adhered to the transparent layer 20, is vapor coated with a reflective layer 24. The reflective means 24 comprises a metallic film which is disposed on the light-sensitive layer 22 via a high vacuum process. Use of this technique generates reflectivity levels of over 90%. Other thin-film methods which may be employed include the sputter technique.

The composition of the metallic layer is dependent on the wavelength of the transmitted light and the level of adhesion required between the light-sensitive layer 22 and the reflective means 24. For example, when the transmitted light has a wavelength of approximately 700 manometers, the following metallic layers may be employed: copper, aluminum, chromium and silver.

The thin-film process may also be utilized to provide an additional protective layer on top of the metallic layer to protect against mechanical damage. After adding the protective layer, the timing disks and rules may be cut out of the light-sensitive film to generate the light-sensitive layer 22 for the timing disk 6a or the timing rule 32.

The inventive methodology enables one to produce products of high quality and dependability, and high resolution.

The inventive timing devices are preferably employed in ink-jet printers. In color printing especially, accurate positioning of the printer head over the photosensory system integrated in a control circuit is required. A simple and economical construction is possible due to the fact that the transmitter 12a, receiver 14a and sensor 16 are positioned on the same side of the timing device.

In the various figures showing the timing disks, the codings have been predominantly represented by slits (See FIGS. 1a and 2a). In principle, however, other geometric forms are possible; in particular, single and multiple channels.

For example, FIG. 3 shows a timing disk 6c having a plurality of patterns 26, 28, 30 arranged concentric to one another on the rotatable disk.

The geometrical shape of the timing control element can also vary. FIG. 4 shows a timing control element in the form of a timing rule 32 wherein the window patterns 34a, 34b are arranged in a selected sequence. In one pattern 34a, the sizes of the transparent 38 and opaque 40 windows are uniform. In another pattern 34b, the transparent 42 and opaque 44 windows bear a logarithmic relationship.

The timing rule of FIG. 4 further comprises means for fastening the timing rule 32 in a pre-selected location. The means includes fastening openings 36 located at each end of the timing rule.

Although the present invention has been described in connection with the foregoing embodiments and illustrations, these embodiments are merely illustrative and are not intended to be limiting. Other modifications and improvements should be readily apparent to those skilled in the art, and the present invention encompasses these modifications and improvements.

I claim:

1. A timing device comprising:

a timing control element including thereon a plurality of transparent windows and opaque windows arranged in at least one pattern;

are reflective layer, disposed behind said transparent and opaque windows, for reflecting light;

a transmitter for emitting light toward said timing control element;

a control mechanism for said timing control element to controllably select one of said transparent and opaque windows in said at least one pattern to be in a path of the emitted light, the emitted light propagating through the selected window and being reflected by said reflective layer only when the selected window is transparent; and a receiver, disposed adjacent to said transmitter, for generating an electrical signal in response to the reflected light.

2. The timing device of claim 1, wherein the timing control element comprises a light-sensitive layer having said transparent and opaque windows, the reflective layer disposed on a selected surface of the light-sensitive layer, and a transparent layer disposed on a surface of the light-sensitive layer opposite the selected surface.

3. The timing device of claim 2, wherein the reflective layer comprises a layer having a metallic coating.

4. The timing device of claim 5, wherein the metallic coating is formed by a thin-film process.

5. The timing device of claim 6, wherein the metallic coating comprises a selected metal of copper, aluminum, chromium and silver.

6. The timing device of claim 5, wherein a protective layer is added to the metallic coating to protect said reflective layer against mechanical damage.

7. The timing device of claim 1, wherein the timing control element comprises a rotatable disk having said transparent and opaque windows in said at least one pattern on the periphery thereof.

8. The timing device of claim 7, wherein said transparent and opaque windows are arranged in a plurality of patterns concentric to one another on the rotatable disk, and wherein said at least one pattern is selected from said plurality of patterns.

9. The timing device of claim 1, wherein the timing control element comprises a timing rule having thereon said transparent and opaque windows along said rule.

10. The timing device of claim 9, wherein said transparent and opaque windows are arranged in a plurality of patterns in a sequential order, and wherein said at least one pattern is selected from said plurality of patterns.

11. The timing device of claim 1, wherein sizes of said transparent and opaque windows are uniform.

12. The timing device of claim 1, wherein the sizes of the transparent and opaque windows bear a logarithmic relationship.

13. The timing device of claim 9 further comprising a fastening portion for fastening said timing rule in a pre-selected location.

14. The timing device of claim 13, wherein said fastening portion includes fastening openings located at each end of the timing rule.

* * * * *

UNITED STATES PATENT AND TRADEMARK OFFICE
CERTIFICATE OF CORRECTION

PATENT NO. : 5,508,088
DATED : April 16, 1996
INVENTOR(S) : Paul-Wilhelm Braun

It is certified that error appears in the above-indentified patent and that said Letters Patent is hereby corrected as shown below:

Column 6, line 30, "claim 5" should read --claim 3--;

Column 6, line 32, "claim 6" should read --claim 3--;

Column 6, line 35, "claim 5" should read --claim 3--.

Signed and Sealed this

Third Day of September, 1996

Attest:

BRUCE LEHMAN

Attesting Officer

Commissioner of Patents and Trademarks